3,264,253
POLYMER COMPOSITIONS
William John G. McCulloch, Plainfield, Walter E. Heumann, Jersey City, and Philip L. Mercier, Plainfield, N.J., assignors to Esso Research and Engineering Company, a corporation of Delaware
No Drawing. Filed Dec. 28, 1956, Ser. No. 631,039
6 Claims. (Cl. 260—41)

The present invention relates to polymer compositions, especially those polymers prepared with alpha olefins. Specifically it concerns compounding poly alpha olefins, such as polypropylene, with fillers.

When polyethylene, a well-known poly alpha olefin, is compounded with fillers, such as carbon black, silica, etc., its flexibility and extensibility are greatly reduced and it is necessary to irradiate it in order to obtain a product having the wanted degree of flexibility. Irradiation significantly increases the cost of the product and therefore it is desirable to eliminate this extra step.

It has now been found that polymers prepared with higher alpha olefins, such as propylene, can be compounded with as much as 50 parts by weight of filler per 100 parts by weight of polymer.

The polymers within the scope of the present invention are those prepared with higher alpha olefins, especially those containing 3 to 4 carbon atoms, having a density between 0.860 and 0.890 as measured by the gradient method at 25° C. Any convenient manner of preparing these polymers may be employed, but the preferred method involves the use of a catalyst comprising an organo metallic compound and a reducible or partially reduced heavy metal compound.

In preparing the catalyst the organo-metallic compound to be used is preferably one having the general formula $R_2AlX$, or one having the general formula $R_3Al$, in which R is preferably a lower alkyl group, such as ethyl, propyl, isobutyl, or higher, e.g., up to 8–10 carbon atoms, or sometimes methyl; and X is a halogen, preferably chlorine. Dialkyl, particularly diethyl aluminum chloride is preferred. The reducible compound of a heavy metal of Groups IV–B—VI–B may be a halide, oxide, etc. Titanium tetrachloride is the preferred example of such metal compounds. The mixture or complex of these two catalyst components should be prepared by using a molar ratio of the aluminum alkyl compound to the titanium tetrachloride ranging from about 0.5/1 to 5/1, the preferred proportions being about 1/1 to 3/1.

The catalyst may be prepared in various ways, but it is convenient to dissolve the desired amount of each of the two separate components in a suitable solvent and then mix the two solutions at the desired catalyst preparation temperatures, which may be about 0°–50° C., preferably about 20°–30° C., or about room temperature. Any suitable inert solvent, such as normal heptane or a refined kerosene or gas oil, may be used as the catalyst diluent; however, it is preferred to employ the same liquid used as the polymerization diluent.

In the use of such complex catalysts, it has generally been found necessary or at least desirable to pretreat the catalyst mixture or complex resulting, for instance, from the mixing of diethyl aluminum chloride with titanium tetrachloride, by stirring it for a substantial period of time, e.g., one-half hour to 1 hour or more, and accordingly, this had been conveniently done in a separate catalyst preparation zone or container followed by transfer to the polymerization reactor. Similar pretreating methods may be used for the purposes of the present invention. In the case of propylene polymerization, it may be desirable to pretreat the catalyst in this maner at an Al/Ti ratio of, say, about 0.4–1 and activate the catalyst during polymerization with additional aluminum alkyl to establish an Al/Ti ratio of about 1.5–2.5.

It is essential, or at least desirable, to prevent contact of the catalyst components or complex with oxygen, moisture, or other harmful materials which interfere with the desired polymerization of the olefin to high molecular weight solid polymer. This may be done by pressuring the catalyst containers, polymerization reactor, etc., with nitrogen, methane, or other suitable blanketing gas.

The temperature to be used during the polymerization may vary over a fairly wide range, for instance, about 0–100° C., although it is preferred to start the reaction at room temperature or about 20°–40° C., and then let the temperature rise due to heat of polymerization up to the desired operating range of about 50°–90° C., or preferably about 60°–70° C., with the application of cooling to prevent overheating. The pressure need not substantially exceed atmospheric provided the diluent is maintained in the liquid state. Slightly elevated pressures up to about 10 to 20 atmospheres are normally adequate for this purpose at the polymerization temperatures referred to above.

After the polymerization has proceeded to the desired extent, the product slurry may be contacted with a suitable inactivator, such as 10–100 vol. percent or so of isopropanol or other alcohol. Thereafter, polymer may be suitably recovered by flashing of the diluent followed by filtration, preferably after it has been slurried by mixing it with an additional amount of isopropanol which may suitably be about 5–25 times the amount used for inactivating the reaction. The resulting slurry may then be stirred, desirably for 5–30 minutes or so, preferably for about 15–20 minutes, while heating it to a temperature of about 50° to 80° C., preferably about 60°–70° C., to assist in removing residual catalyst constituents from the polymer. The slurry is finally filtered and the polymer dried to give a granular powder. In the case of polypropylene, the molecular weight will depend on several variables, such as the catalyst components and proportions thereof, and the polymerization temperature, but normally will be from about 5,000–500,000 and preferably about 20,000–100,000, as determined by the Harris modification of the Staudinger method.

The density of these polymers is a critical factor because higher density polymers become inflexible when loaded with more than a few parts of filler. Therefore according to the present invention, the $C_3$ to $C_4$ polymers compounded with the fillers should have a density between 0.860 and 0.890, and preferably between 0.875 and 0.885. The density is at least partially dependent on the structure of the monomer, that is, whether it forms a straight or branched polymer. For instance, while a density of 0.920 would be low for polyethylene, it would be very high for polypropylene. Furthermore, the polymer should have a tensile strength of at least 800 p.s.i. and an elongation of about 50%. Polymers having a density in this range may be compounded with a large quantity of any conventional inert fillers, which include channel and furnace blacks as well as clay, diatomaceous earth, wood flour, shell flour, keratin, etc. The amount of inorganic or organic filler used will depend on the effect desired and the type of filler employed. Generally it is best to use between about 0.5 and 50 parts or as high as 100 parts by weight of filler for each 100 parts by weight of polymer and it is especially desirable to use between about 10 and 40 parts of filler per 100 parts of polymer.

The method of compounding is not critical, it being merely necessary that the mixture be homogeneous. A typical compounding method involves milling the filler into the polymer at room temperature (25° C.) and atmospheric pressure. Other compounding apparatus may be employed, such as Banbury mixers, extruders, etc. If necessary, elevated temperatures may be used to accelerate the admixing. In such cases the compounding temperature used may be up to 200° C., e.g., between 120° and 180° C. Usually the filler is added in small increments to insure good distribution, but if desired it may all be added at one time. The time required for mixing will vary according to the amount of filler to be added and the compounding temperature, but generally it takes from about 5 minutes to about 30 minutes and preferably between about 5 and 15 minutes.

The compounded polymer has several distinct advantages. One of these is that the uncompounded polymer may be tacky the compounded polymer is not. Furthermore, it has been found that the compounded product has better weather resisting characteristics. These benefits, as well as others not quite so evident, are illustrated by the following experiments:

Samples of low density polyethylene (0.920) having a Harris molecular weight of about 21,000 were compounded with various amounts of an easy processing channel black (EPC) and 0.1 wt. percent of N-lauric amido phenol, an antioxidant, on a laboratory mill at 25° C. by adding the filler and antioxidant over a 10-minute period.

TABLE I

| Parts by Wt. of Filler/100 Parts by Wt. of Polymer | 0 | 25 | 50 |
|---|---|---|---|
| Polymer Properties: | | | |
| Tensile Strength, p.s.i. | 1,750 | 2,130 | 2,080 |
| Elongation, percent | 625 | 90 | 10 |
| Modulus of Rigidity 25° C. (p.s.i.×10⁻⁴) | 2.0 | 3.2 | 4.9 |

The tensile strength and elongation were measured by the method described in ASTM D-412, while the modulus of rigidity was measured according to ASTM D-1043. The results show that when substantial amounts of filler are employed polyethylene becomes more rigid and has a very low elongation value.

One hundred parts by weight of the same polyethylene used in the above experiment was compounded in the same manner with 40 parts by weight of a silica-containing filler sold under the trade name Hi Sil–233 and 0.1 wt. percent of N-lauric amido phenol.

TABLE II

Polymer properties:
    Tensile strength, p.s.i. _____ 2520
    Elongation, percent _____ 10
    Modulus of rigidity @ 25° C. (p.s.i.×10⁻⁴) 3.7

The data in the above table show that siliceous as well as carbon fillers drastically decrease the flexibility and extensibility of polyethylene.

A sample of linear polyethylene having a Harris molecular weight of about 60,000 and a density of 0.950, was compounded on a laboratory mill at 150° C. with varying amounts of MPC carbon black and evaluated for flexibility, elongation and tensile strength.

TABLE III

| Parts by Wt. of Filler/100 Parts by Wt. of Polymer | 0 | 10 | 25 | 40 |
|---|---|---|---|---|
| Polymer Properties: | | | | |
| Tensile Strength, p.s.i. | 3,540 | 4,150 | 4,680 | 4,850 |
| Elongation, percent | 270 | 130 | 25 | 0 |
| Modulus of Rigidity 25° C. (p.s.i.×10⁻⁴) | 6.3 | 7.8 | 12.3 | 14.9 |

These results show that linear polyethylene becomes very stiff and brittle and has poor extensibility when loaded with even a small amount of filler.

A batch of medium density polypropylene (0.893) was prepared by polymerizing propylene in the presence of violet titanium trichloride and aluminum triethyl (Al/Ti 2:1) at 50° C. and under approximately 10 atmospheres pressure. The polymer, which had a molecular weight of about 170,000, was compounded on a laboratory mill at 177° C. with varying amounts of MPC carbon black and 0.1 wt. percent of N-lauric amido phenol. The polymers were then evaluated for flexibility, etc.

TABLE IV

| Parts by Wt. of Filler/100 Parts by Wt. of Polymer | 0 | 10 | 25 | 40 |
|---|---|---|---|---|
| Polymer Properties: | | | | |
| Tensile Strength, p.s.i. | 2,400 | 2,900 | 3,290 | 3,680 |
| Elongation, percent | 210 | 130 | 25 | 0 |
| Modulus of Rigidity 25° C. (p.s.i.×10⁻⁴) | 3.8 | 5.0 | 6.3 | 9.4 |

The data show that at high carbon black loadings the medium density polymer becomes stiff, brittle and has poor extensibility.

In another test the same polymer was compounded in the same manner with a siliceous filler, sold under the trade name of Hi Sil–233, along with 0.1 wt. percent of N-lauric amido phenol. The results are given in Table V:

TABLE V

| Parts by Wt. of Filler/100 Parts by Wt. of Polymer | 0 | 10 | 25 | 40 |
|---|---|---|---|---|
| Polymer Properties: | | | | |
| Tensile Strength, p.s.i. | 2,400 | 2,790 | 3,600 | 3,840 |
| Elongation, percent | 210 | 190 | 25 | 0 |
| Modulus of Rigidity 25° C. (p.s.i.×10⁻⁴) | 3.8 | 4.6 | 8.1 | 10.3 |

These results indicate that the presence of substantial quantities of either carbon black or siliceous filler in polypropylene having a density greater than 0.890 leads to compounds having high tensile and stiffness values and low extensibility.

*Example 1*

A batch of low density polypropylene (0.880) having a Harris molecular weight of 90,000 was prepared by polymerizing propylene in the presence of an aluminum triethyl-titanium tetrachloride catalyst, having an Al/Ti ratio of 2:1, at 27° C. under 1 atmosphere of pressure and loaded on a laboratory mill at 177° C. with varying amounts of channel black (EPC) and evaluated for flexibility, tensile strength and elongation.

TABLE VI

| Parts by Wt. of Filler/100 Parts by Wt. of Polymer | 0 | 25 | 50 |
|---|---|---|---|
| Polymer Properties: | | | |
| Tensile Strength, p.s.i. | 1,650 | 1,540 | 1,750 |
| Elongation, percent | 660 | 410 | 170 |
| Modulus of Rigidity 25° C. (p.s.i.×10⁻⁴) | 1.1 | 1.8 | 2.2 |

The results demonstrate that low density polypropylene retains a large measure of its flexibility and extensibility even when loaded with a considerable quantity of carbon black. The above data show the superiority of low density polypropylene over high or low density polyethylene and medium to high density polypropylene.

*Example 2*

In another test 100 parts by wt. of polypropylene, the same as that employed above, was loaded in the same way with 40 parts by weight of a siliceous filler, sold under the trade name Hi Sil–233 and 0.1 wt. percent of N-lauric amido phenol, and evaluated for its physical properties.

TABLE VII

Polymer properties:

Tensile strength, p.s.i. _____ 1750
    Elongation, percent _____ 260
    Modulus of rigidity 25° C. (p.s.i.×10⁻⁴) ___ 2.0

Again, as in the case of carbon black, the loaded low density polypropylene retained a large proportion of its original flexibility and extensibility while polyethylene and higher density polypropylene were markedly inferior in these properties.

The foregoing experiments exemplify the present invention, but it is not intended that it be limited to the specific conditions set forth therein, but rather that it include any obvious equivalents such as the use of different kinds of fillers, e.g., high abrasion, semi-reinforcing, as well as fillers obtained from various natural sources, e.g., kaolin clay. Furthermore, other components may be compounded with the polymer such as stabilizers, antioxidants and plasticizers. The loaded polymers of the present invention may be used in the manufacture of flexible pipes, hoses, belts, etc.

What is claimed is:

1. A flexible composition of matter consisting essentially of 100 parts by weight of polypropylene having a density between 0.860 and 0.890 and 25 to 50 parts by weight based on the polypropylene of channel black.

2. A flexible composition of matter consisting essentially of 100 parts by weight of polypropylene having a density between about 0.860 and about 0.890 and 25 to 100 parts by weight based on the polypropylene of a filler selected from the group consisting of carbon black and silica.

3. The composition of claim 2 in which the filler is channel black.

4. The composition of claim 2 in which the filler is a silica.

5. A flexible composition of matter consisting essentially of 100 parts by weight of polypropylene having a tensile strength of at least 800 p.s.i. and a density between 0.875 and 0.885 and about 25 to 50 parts by weight of an inert filler selected from the group consisting of carbon black and silica.

6. The composition of claim 5 in which the polypropylene has a molecular weight of about 20,000 to 100,000.

References Cited by the Examiner

UNITED STATES PATENTS

| | | |
|---|---|---|
| 2,593,943 | 4/1952 | Wainer. |
| 2,692,257 | 10/1954 | Zletz _____ 260—93.7 |
| 2,728,735 | 12/1955 | Anderson _____ 260—41 XR |
| 2,728,740 | 12/1955 | Iler. |
| 2,731,453 | 1/1956 | Field et al. |
| 2,824,089 | 2/1958 | Peters et al. _____ 260—93.7 XR |
| 2,862,917 | 12/1958 | Anderson et al. ____ 260—93.7 |
| 2,958,672 | 11/1960 | Goldberg. |
| 2,959,563 | 11/1960 | Haehn et al. |
| 2,967,849 | 1/1961 | Hawkins et al. |

FOREIGN PATENTS

| | | |
|---|---|---|
| 538,782 | 12/1955 | Belgium. |
| 532,665 | 1/1941 | Great Britain. |
| 729,669 | 5/1955 | Great Britain. |

OTHER REFERENCES

Chem. Eng. News, June 18, 1956, page 2980.

Gaylord et al., "Linear and Stereoregular Addition Polymers," 1959, Interscience Publishers, Inc., New York.

MORRIS LIEBMAN, *Primary Examiner.*

LESLIE H. GASTON, DANIEL ARNOLD,
*Examiners.*

H. A. FEELEY, B. S. LEON, E. F. McKINNEY, K. B. CLARKE, A. LIEBERMAN, *Assistant Examiners.*